(12) United States Patent
Zhong et al.

(10) Patent No.: US 11,193,704 B2
(45) Date of Patent: Dec. 7, 2021

(54) HEAT PUMP REVERSING VALVE CONTROL BASED ON THE VALVE REVERSING PRESSURE AND THE SYSTEM PRESSURE

(71) Applicants: Gree Electric Appliances (Wuhan) Co., Ltd, Hubei (CN); Gree Electric Appliances, Inc. of Zhuhai, Guangdong (CN)

(72) Inventors: Hailing Zhong, Guangdong (CN); Qi Cheng, Guangdong (CN); Kailiang Huang, Guangdong (CN); Yang Liu, Guangdong (CN); Siyuan Liu, Guangdong (CN); Min Li, Guangdong (CN); Puzhong Wang, Guangdong (CN)

(73) Assignees: Gree Electric Appliances (Wuhan) Co., Ltd, Wuhan (CN); Gree Electric Appliances, Inc. of Zhuhai, Zhuhai (CN)

( * ) Notice: Subject to any disclaimer, the term of this patent is extended or adjusted under 35 U.S.C. 154(b) by 86 days.

(21) Appl. No.: 16/636,277

(22) PCT Filed: Aug. 2, 2018

(86) PCT No.: PCT/CN2018/098221
§ 371 (c)(1),
(2) Date: Feb. 3, 2020

(87) PCT Pub. No.: WO2019/024881
PCT Pub. Date: Feb. 7, 2019

(65) Prior Publication Data
US 2021/0164714 A1    Jun. 3, 2021

(30) Foreign Application Priority Data

Aug. 3, 2017  (CN) .................. 201710654735.X

(51) Int. Cl.
*F25B 49/02*  (2006.01)
*F25B 41/34*  (2021.01)
*F25B 13/00*  (2006.01)

(52) U.S. Cl.
CPC .............. *F25B 49/02* (2013.01); *F25B 13/00* (2013.01); *F25B 41/34* (2021.01);
(Continued)

(58) Field of Classification Search
CPC ............ F25B 13/00; F25B 2313/02741; F25B 2313/0292; F25B 2600/2513;
(Continued)

(56) References Cited

U.S. PATENT DOCUMENTS

2006/0037652 A1* 2/2006 Hall ...................... F16K 31/061
137/625.43
2008/0028779 A1* 2/2008 Song ....................... F25B 41/31
62/190

(Continued)

FOREIGN PATENT DOCUMENTS

CN     1318723 A      10/2001
CN     103388945 A    11/2013
(Continued)

OTHER PUBLICATIONS

International Search Report, dated Sep. 28, 2018, in International application No. PCT/CN2018/098221, filed on Aug. 2, 2018.
(Continued)

*Primary Examiner* — Henry T Crenshaw
(74) *Attorney, Agent, or Firm* — McAndrews, Held & Malloy, Ltd.

(57) ABSTRACT

Provided are a control method of a heat pump system and a heat pump system. The heat pump system includes a throttling element and a four-way valve. The four-way valve has a first state in a case that the heat pump system operates for
(Continued)

refrigerating and a second state in a case that the heat pump system operates for heating. The control method includes that: before the four-way valve is switched from the first state to the second state, A is compared with B, and switching of the state of the four-way valve is controlled and the opening degree of the throttling element is adjusted according to the comparison result, or switching of the state of the four-way valve is controlled according to the comparison result, or the opening degree of the throttling element is adjusted according to the comparison result.

20 Claims, 9 Drawing Sheets

(52) U.S. Cl.
CPC ............. *F25B 2313/0292* (2013.01); *F25B 2313/02741* (2013.01); *F25B 2500/26* (2013.01); *F25B 2500/28* (2013.01); *F25B 2600/2513* (2013.01)

(58) Field of Classification Search
CPC ...... F25B 2700/1931; F25B 2700/1933; F25B 2700/21151; F25B 41/34; F25B 49/02
See application file for complete search history.

(56) References Cited

U.S. PATENT DOCUMENTS

| | | | | |
|---|---|---|---|---|
| 2008/0262857 A1* | 10/2008 | Perera | ............... | H02J 3/008 705/1.1 |
| 2016/0001634 A1* | 1/2016 | Terada | ............... | B60H 1/00007 62/160 |
| 2018/0031267 A1* | 2/2018 | Hern | ............... | F25D 21/04 |

FOREIGN PATENT DOCUMENTS

| | | |
|---|---|---|
| CN | 103807917 A | 5/2014 |
| CN | 103968494 A | 6/2014 |
| CN | 104676997 A | 6/2015 |
| CN | 104964476 A | 7/2015 |
| CN | 104896809 A | 9/2015 |
| CN | 106440558 A | 2/2017 |
| CN | 107388663 A | 11/2017 |
| JP | 2017083143 A | 5/2017 |
| JP | 6147173 B2 | 6/2017 |
| KR | 20080001308 A | 1/2008 |
| WO | 2013/065233 A1 | 5/2013 |
| WO | WO20130655233 * | 5/2013 |

OTHER PUBLICATIONS

Chinese search report dated Aug. 3, 2017 in Chinese application No. 201710654735X (1 page).

The search report for Indian Application No. 120154272.7, dated Jun. 10, 2020, Intellectual Property India, The Patent Office, New Delhi (6 pages).

The extended European search report for Application No. 18842366. 9, dated Mar. 30, 2021, European Patent Office, Germany (9 pages).

* cited by examiner

HEAT PUMP REVERSING VALVE CONTROL BASED ON THE VALVE REVERSING PRESSURE AND THE SYSTEM PRESSURE

CROSS-REFERENCE TO RELATED APPLICATIONS

This application is a 371 of International Patent Application No PCT/CN2018/098221, filed Aug. 2, 2018, which claims priority to Chinese Patent Application No. 201710654735.X, entitled "Control Method for Heat Pump System and Heat Pump System", filed on Aug. 3, 2017, the contents of both of which are hereby incorporated by reference in their entirety.

TECHNICAL FIELD

The disclosure relates to the field of automatic control of a heat pump system, in particular to a control method of a heat pump system and a heat pump system.

BACKGROUND

When an air conditioning system starts heating, especially at a low ambient temperature, the low pressure of the air conditioning system is relatively low, so it is easy for a compressor to suffer from low-pressure protection caused by insufficient air supply at an air suction port when the air conditioning system starts. In addition, when the air conditioning system starts heating, a four-way valve is reversed, which causes a large amount of refrigerant to pour into the compressor, and causes liquid entrainment of the compressor.

SUMMARY

According to an aspect, the disclosure adopts the following technical solution.

A control method of a heat pump system is provided. The heat pump system includes a throttling element and a four-way valve, and the four-way valve has a first state in a case that the heat pump system operates for refrigerating and a second state in a case that the heat pump system operates for heating. The control method includes that:

before the four-way valve is switched from the first state to the second state, a reversing pressure difference A of the four-way valve is compared with a current system pressure difference B calculated by a system high pressure and a system low pressure of the heat pump system to obtain a comparison result; and, switching of a state of the four-way valve is controlled and an opening degree of the throttling element is adjusted according to the comparison result, or switching of a state of the four-way valve is controlled according to the comparison result, or an opening degree of the throttling element is adjusted according to the comparison result.

Optionally, the control method further includes that: in a case that the reversing pressure difference A is less than the current system pressure difference B, the state of the four-way valve is not switched, and the opening degree of the throttling element is increased; or in a case that the reversing pressure difference A is greater than or equal to the current system pressure difference B, the four-way valve is switched from the first state to the second state.

Optionally, the opening degree of the throttling element is increased to an opening degree D, and the opening degree D is 30% to 80%.

Optionally, the after the four-way valve is switched from the first state to the second state, the opening degree of the throttling element is reduced.

Optionally, the opening degree of the throttling element is reduced to an opening degree E, and the opening degree E is 30% to 80%.

Optionally, the opening degree D is greater than the opening degree E.

Optionally, after the opening degree of the throttling element is reduced and maintained for a first predetermined time period, a current actual superheat degree x of the heat pump system is compared with a target value C of a suction superheat degree to control the opening degree of the throttling element.

Optionally, in a case that the actual superheat degree x and the target value C of the suction superheat degree satisfy: x−C≤a first threshold XX, the opening degree of the throttling element is reduced; or in a case that the actual superheat degree x and the target value C of suction superheat degree satisfy: the first threshold XX<x−C<a second threshold XS, the opening degree of the throttling element is kept unchanged; or in a case that the actual superheat degree x and the target value C of suction superheat degree satisfy: x−C≥the second threshold XS, the opening degree of the throttling element is increased.

Optionally, the method further includes at least one of the following:

the first predetermined time period is 30 s to 60 s; and
the first threshold XX is 1□ to 4□; and
the second threshold XS is 5□ to 1□.

Optionally, in a case that the actual superheat degree x and the target value C of suction superheat degree constantly satisfy in a second predetermined time period: x−C≤the first threshold XX, the opening degree of the throttling element is reduced, or else, the opening degree of the throttling element is kept unchanged; or in a case that the actual superheat degree x and the target value C of suction superheat degree constantly satisfy in a third predetermined time period: x−C≥the second threshold XS, the opening degree of the throttling element is increased, or else, the opening degree of the throttling element is kept unchanged.

Optionally, the method further includes at least one of the following:

the second predetermined time period is 30 s to 60 s; and
the third predetermined time period is 30 s to 60 s.

Optionally, reducing the opening degree of the throttling element comprises: the throttling element is reduced at intervals of a fourth predetermined time period, a step of reducing each time being a first step EXV1 and increasing the opening degree of the throttling element comprises: the throttling element is increased at intervals of a fifth predetermined time period, a step of increasing each time being a second step EXV2; or reducing the opening degree of the throttling element comprises: the throttling element is reduced at intervals of a fourth predetermined time period, a step of reducing each time being a first step EXV1; or increasing the opening degree of the throttling element comprises: the throttling element is increased at intervals of a fifth predetermined time period, a step of increasing each time being a second step EXV2.

Optionally, the method further includes at least one of the following:

the fourth predetermined time period is 30 s to 60 s; and
the fifth predetermined time period is 30 s to 60 s; and
the first step EXV1 is 0.1 to 1%; and
the second step EXV2 is 0.1% to 1%.

Optionally, the control method is applied to starting heating of the heat pump system in a low-temperature environment.

Optionally, the temperature of the low-temperature environment is lower than −5° C.

Optionally, the throttling element is an electronic expansion valve.

According to another aspect, the disclosure adopts the following technical solution.

A heat pump system is provided, which includes the throttling element and the four-way valve, and is controlled by any one of the above control methods.

BRIEF DESCRIPTION OF THE DRAWINGS

By means of the description for embodiments of the disclosure with reference to the accompanying drawings, the above and other objects, features and advantages of the disclosure will become more apparent. In the accompanying drawings.

The above accompanying drawings include the following reference numbers: 1. compressor; 2. oil separator; 3. four-way valve; 4. fin type heat exchanger; 5a. first check valve; 5b. second check valve; 5c. third check valve; 5d. fourth check valve; 6a. first ball valve; 6b. second ball valve; 7. dry filter; 8. electronic expansion valve; 9. flooded shell and tube exchanger; 10. gas-liquid separator; 11. spray pipeline; 12. oil return pipeline; 13. high pressure sensor; 14. low pressure sensor; 15. suction temperature sensor.

DETAILED DESCRIPTION OF THE EMBODIMENTS

The disclosure is described below based on the embodiments. Those of ordinary skill in the art should understand that the drawings are provided for the purpose of illustration, and the drawings are not necessarily to scale.

Unless explicitly required by the context, similar words "including", "comprising", and the like in the whole specification and claims should be interpreted as inclusive meanings rather than exclusive or exhaustive meaning, that is, meanings of "including but not limited to".

Figure 1:
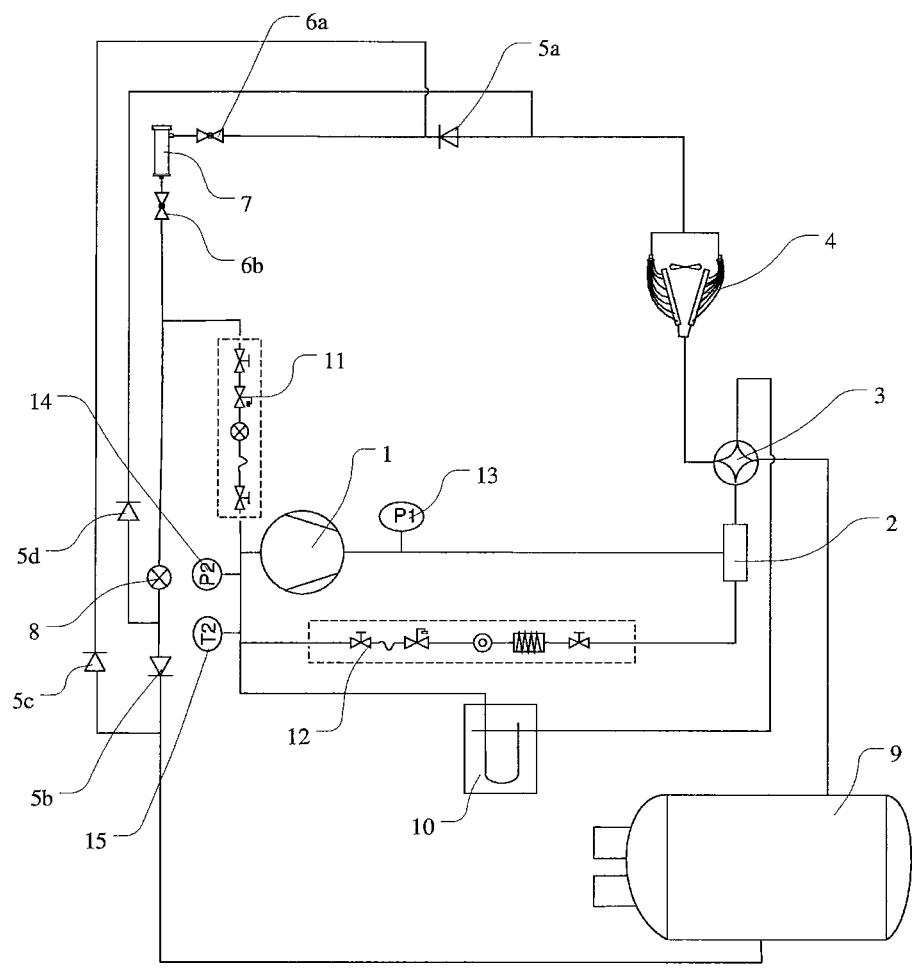
FIG. 1 shows a structure diagram of a heat pump system according to some specific embodiments of the disclosure.

The disclosure provides a control method of a heat pump system. The heat pump system includes a throttling element. The throttling element can be, but is not limited to, an electronic expansion valve (EEV). Certainly, the control method is also applied to other throttling elements capable of throttling. A control method for the throttling element of the disclosure is described below in detail by taking a flooded heat pump air-cooled screw unit for example. Certainly, it is understandable that the control method is also applied to other heat pump systems having the similar problems. As shown in FIG. 1, the flooded heat pump air-cooled screw unit includes a compressor 1, a four-way valve 3, a fin type heat exchanger 4, an electronic expansion valve 8 and a flooded shell and tube exchanger 9, an oil separator 2 is arranged at an exhaust port of the compressor 1, and oil separated from the oil separator 2 flows into an air suction port of the compressor 1 through an oil return pipeline 12, a gas-liquid separator 10 is arranged at an air suction port of the compressor 1, a first check valve 5a, a first ball valve 6a, a dry filter 7 and a second ball valve 6b are arranged on a connection pipeline between the electronic expansion valve 8 and the fin type heat exchanger 4. The air suction port of the compressor 1 is also connected to a pipeline between the electronic expansion valve 8 and the second ball valve 6b through a spray pipeline 11, a second check valve 5b is arranged on a connection pipeline between the electronic expansion valve 8 and the flooded shell and tube exchanger 9. The flooded heat pump air-cooled screw unit further includes two branch pipelines, one end of one of the two branch pipelines is connected to a pipeline between the second check valve 5b and the flooded shell and tube exchanger 9, and the other end is connected to a connection pipeline between the first check valve 5a and the first ball valve 6a, a third check valve 5c is arranged on the one of the two branch pipelines; one end of the other of the two branch pipelines is connected to a connection pipeline between the second check valve 5b and the electronic expansion valve 8, and the other end is connected to a connection pipeline between the first check valve 5a and the fin type heat exchanger 4. A fourth check valve 5d is arranged on the other of the two branch pipelines. In a case that the flooded heat pump air-cooled screw unit operates for refrigerating, a flow direction of refrigerant is: the compressor 1—the oil separator 2—the four-way valve 3—the fin type heat exchanger 4—the first check valve 5a—the first ball valve 6a—dry filter 7—the second ball valve 6b—the electronic expansion valve 8—the second check valve 5b—the flooded shell and tube exchanger 9—the four-way valve 3—the gas-liquid separator 10—the compressor 1. In a case that the flooded heat pump air-cooled screw unit operates for heating, the flow direction of the refrigerant is: the compressor 1—the oil separator 2—the four-way valve 3—the flooded shell and tube exchanger 9—the third check valve 5c—the first ball valve 6a—the dry filter 7—the second ball valve 6b—the electronic expansion valve 8—the fourth check valve 5d—the fin type heat exchanger 4—the four-way valve 3—the gas-liquid separator 10—the compressor 1. Generally, the four-way valve 3 acts according to whether a solenoid valve carried by the four-way valve 3 is powered, in the case that the flooded heat pump air-cooled screw unit operates for heating, the solenoid valve carried by the four-way valve 3 is powered after a reversing pressure difference of the four-way valve 3 is satisfied, and the four-way valve 3 is reversed; In the case that the flooded heat pump air-cooled screw unit operates for refrigerating, the solenoid valve carried by the four-way valve 3 is not powered, and the four-way valve 3 is not powered. A suction temperature sensor 15 and a low pressure sensor 14 are arranged on a suction pipe of the compressor 1, which are configured to respectively detect a suction temperature and a suction pressure (namely a low pressure) of the compressor 1. A high pressure sensor 13 is arranged on an exhaust pipe, which is configured to detect an exhaust pressure (namely a high pressure) of the compressor 1.

A control method of the electronic expansion valve is that: before the four-way valve 3 is switched to a second state (namely a powered state) where the unit operates for heating from a first state (namely a non-powered state) where the unit operates for refrigerating (for example, in a case that the unit starts heating, especially starts heating in a low-temperature environment, for example, the low temperature here is limited to −5☐), a reversing pressure difference A of the four-way valve 3 is compared with a current system pressure difference B calculated by a system high pressure and a system low pressure of the unit, and switching of a state of the four-way valve 3 is controlled according to a comparison result and the opening degree of the electronic expansion valve 8 is adjusted according to the comparison result, or switching of a state of the four-way valve 3 is controlled according to a comparison result, or the opening degree of the electronic expansion valve 8 is adjusted according to a comparison result. The reversing pressure difference A is the intrinsic parameter of the four-way valve 3, and the reversing pressure differences of different four-way valves 3 are different. The current system pressure difference B of the unit is obtained according to a formula: B=high pressure-low pressure, and the high pressure is detected by the high pressure sensor 13, and the low pressure is detected by the low pressure sensor 14.

Figure 2:
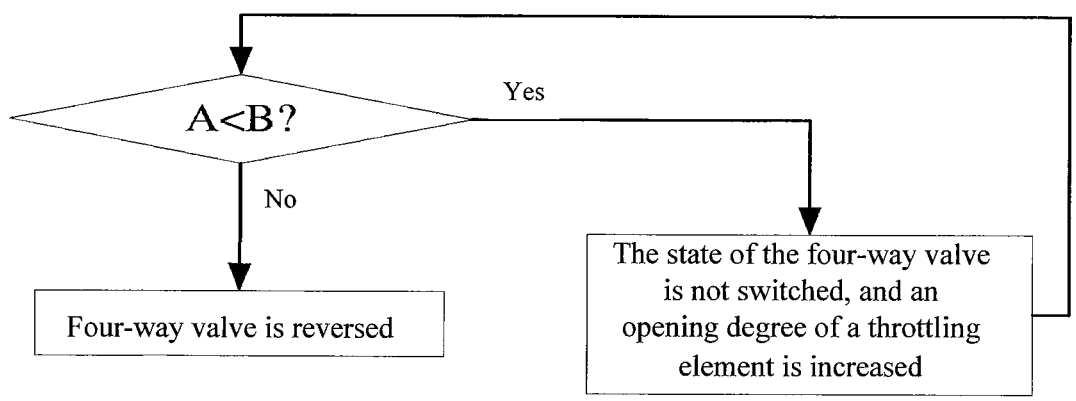
FIG. 2 shows a flowchart of a control method according to some specific embodiments of the disclosure.
Figure 3:
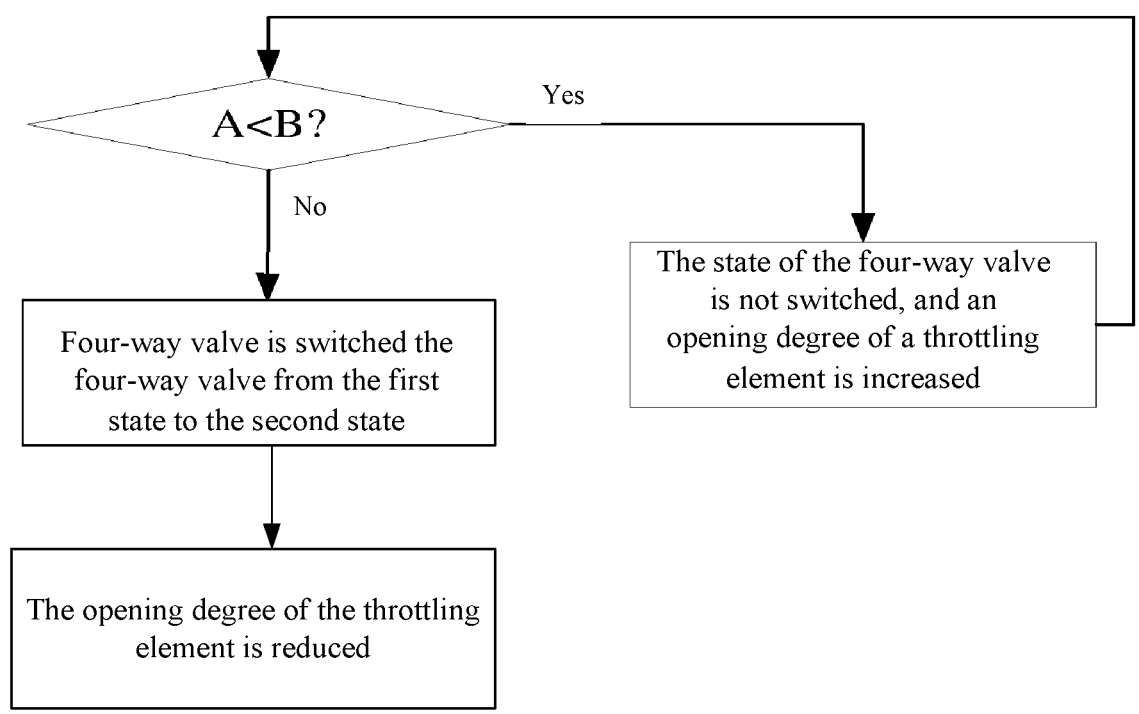
FIG. 3 shows a flowchart of a control method according to some specific embodiments of the disclosure.
Figure 4:
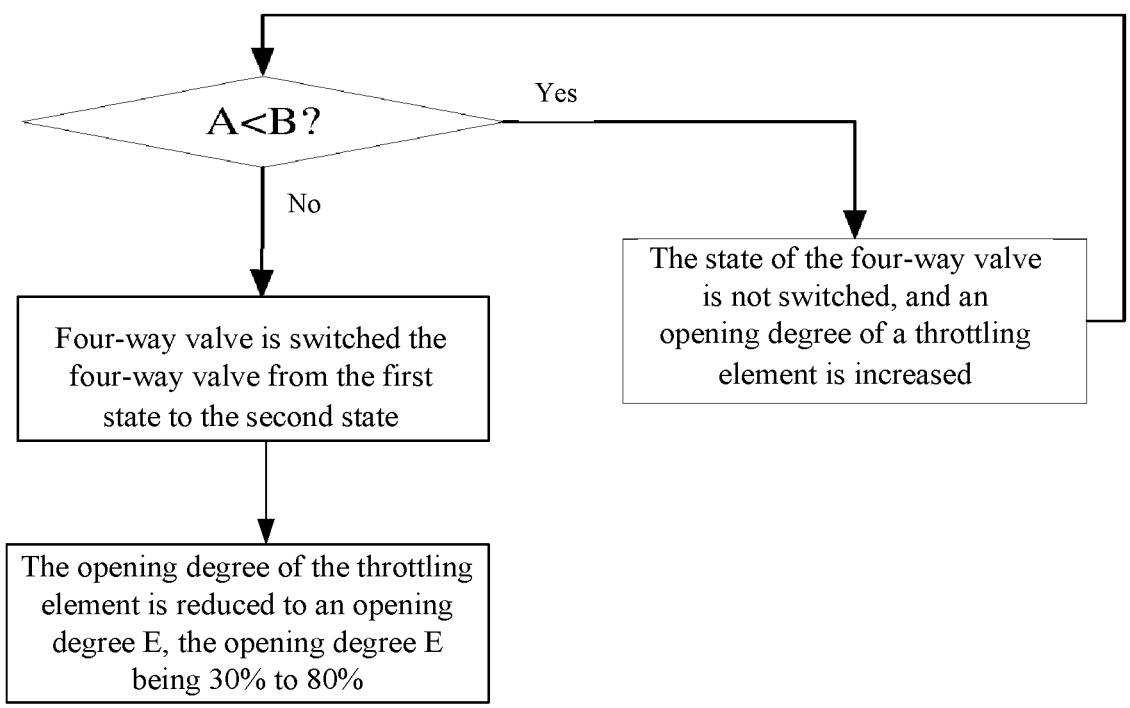
FIG. 4 shows a flowchart of a control method according to some specific embodiments of the disclosure.
Figure 5:
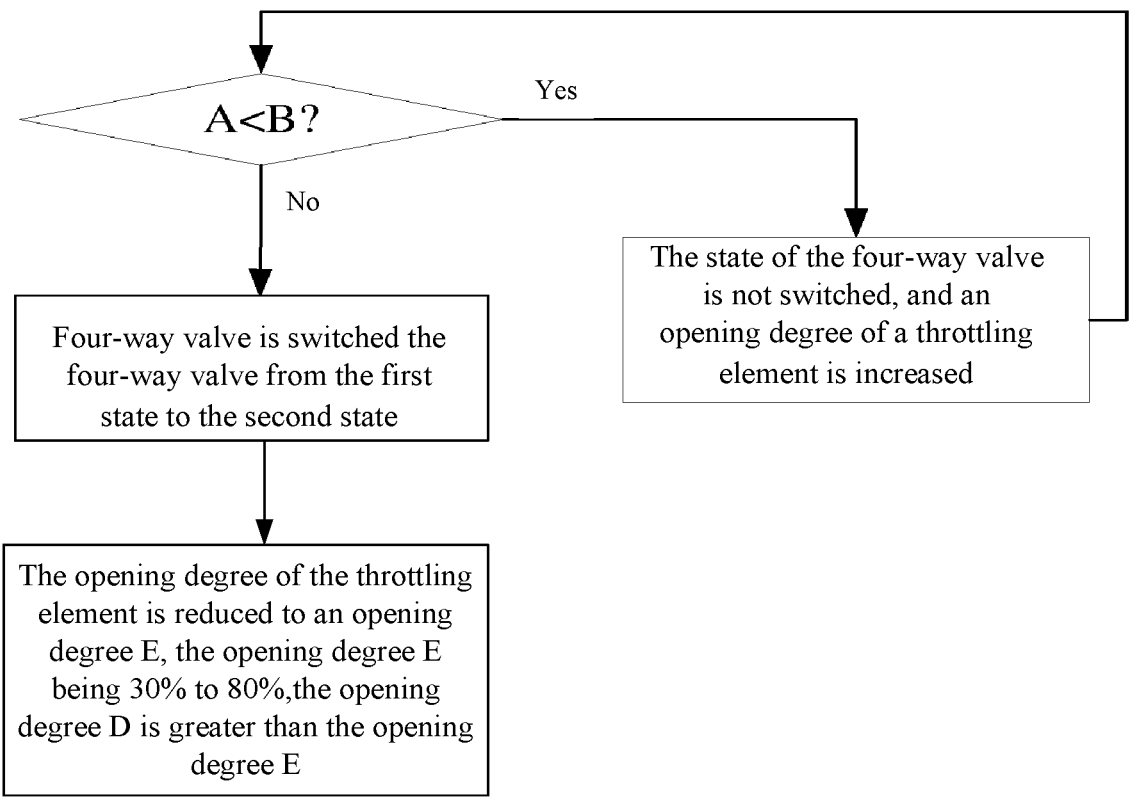
FIG. 5 shows a flowchart of a control method according to some specific embodiments of the disclosure.
Figure 6:
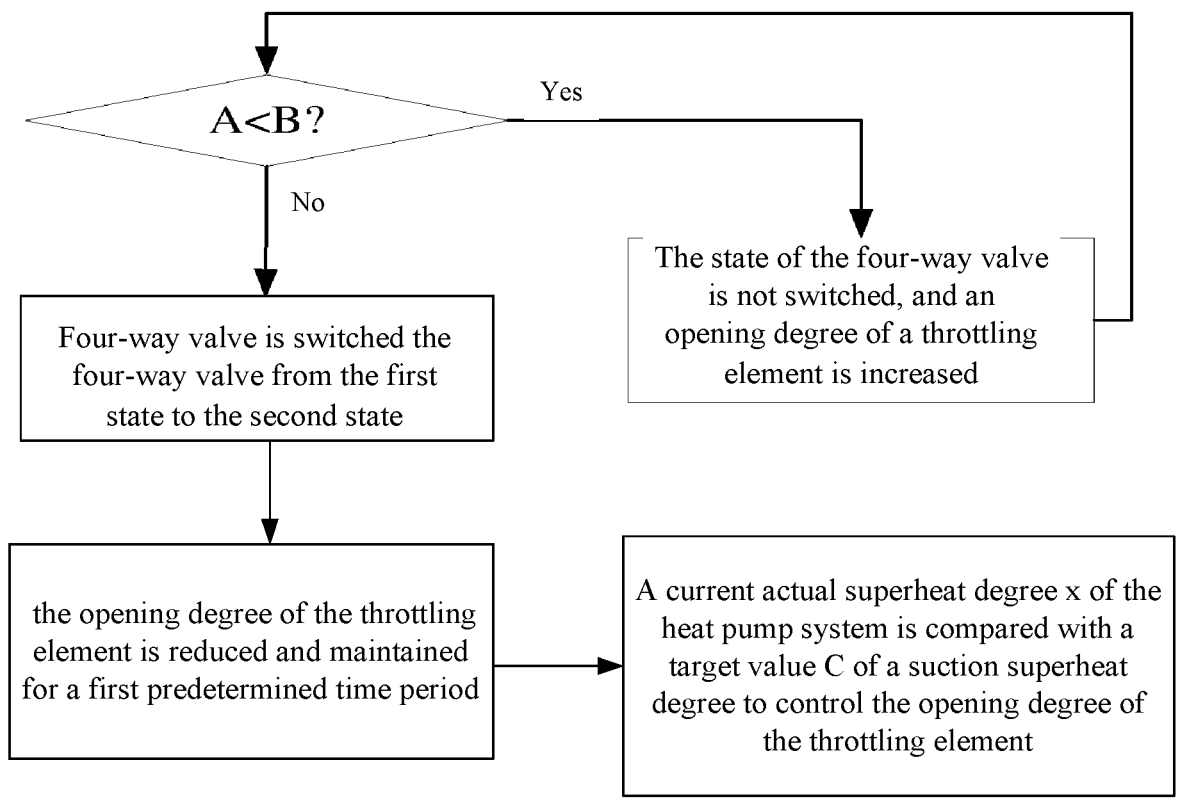
FIG. 6 shows a flowchart of a control method according to some specific embodiments of the disclosure.
Figure 7:
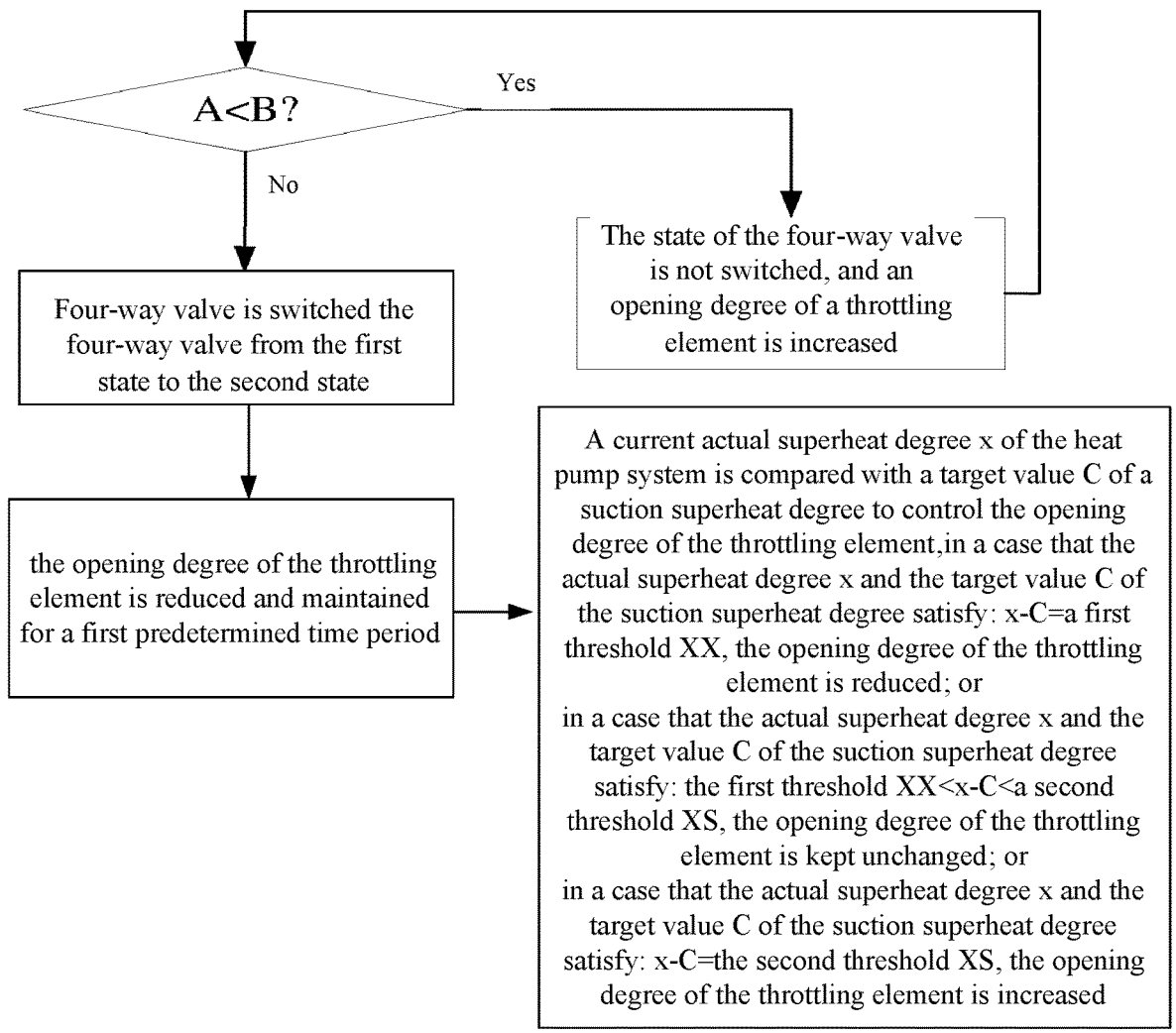
FIG. 7 shows a flowchart of a control method according to some specific embodiments of the disclosure.
Figure 8:
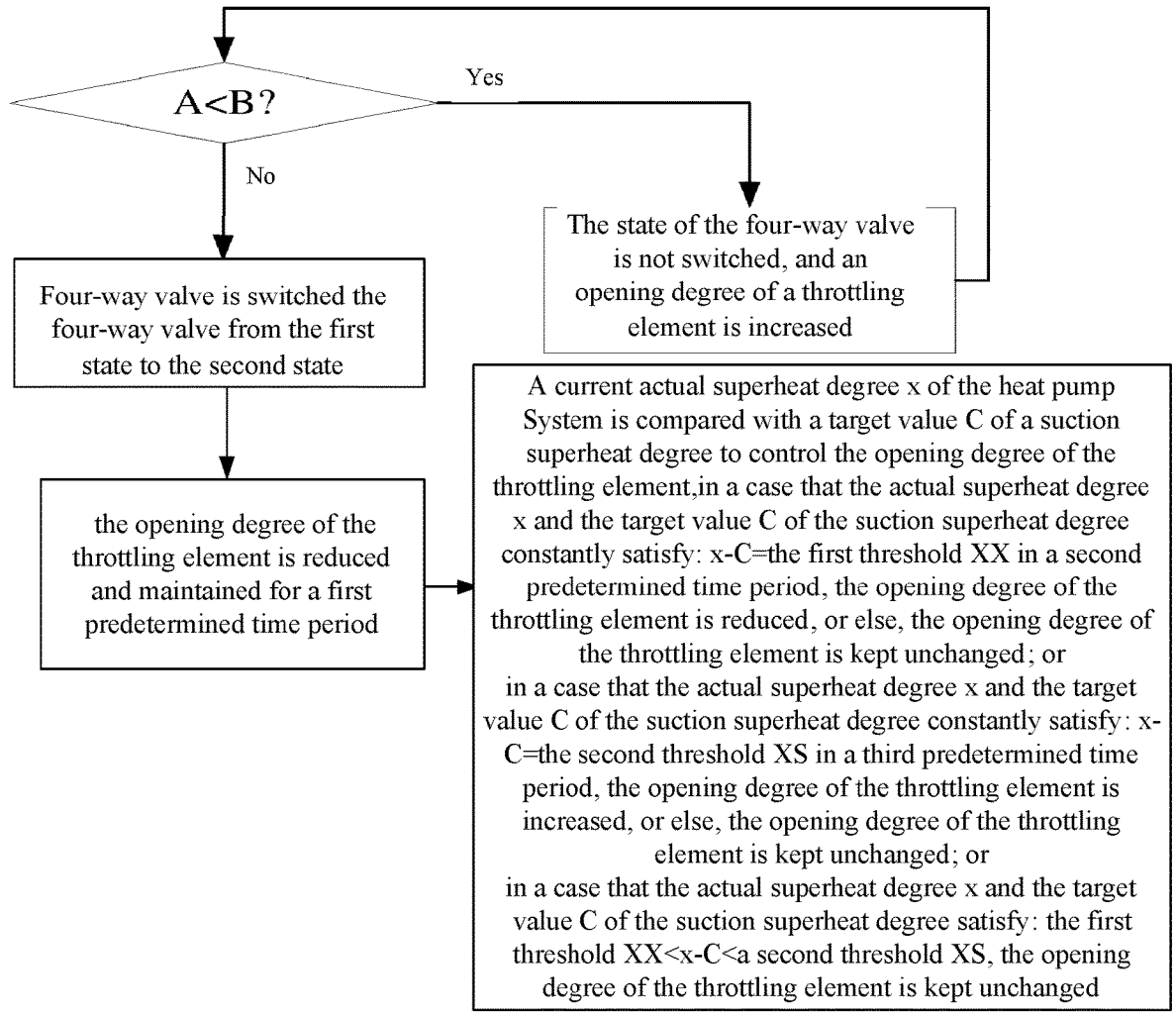
FIG. 8 shows a flowchart of a control method according to some specific embodiments of the disclosure.
Figure 9:
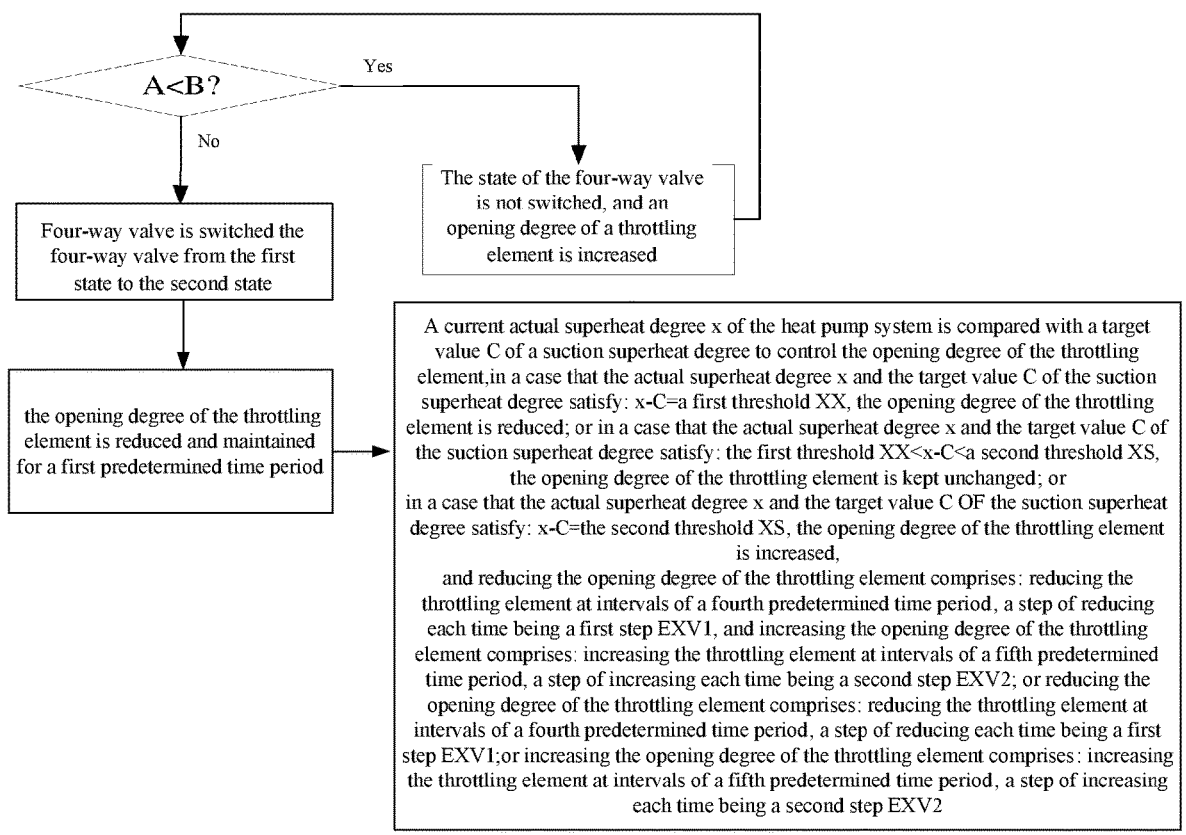
FIG. 9 shows a flowchart of a control method according to some specific embodiments of the disclosure.

Specifically, as shown in FIG. 2, the control method includes the following steps.

At S001, it is judged whether the reversing pressure difference A is less than the current system pressure difference B; if the reversing pressure difference A is less than the current system pressure difference B, S002 is performed; or else, S003 is performed.

At S002, the state of the four-way valve 3 is not switched, and the opening degree of the electronic expansion valve 8 is increased; then, go back to the S001.

At S003, the four-way valve 3 is reserved.

In the case that the reversing pressure difference A is less than the current system pressure difference B, if the four-way valve 3 is reserved in this case, low-pressure protection will be caused by insufficient air supply at the air suction port of the compressor 1, so, the opening degree of the electronic expansion valve 8 is increased to increase the refrigerant flux in the system, so as to meet an air supply demand of the compressor 1, the four-way valve 3 is reversed until the reversing pressure difference A is greater than or equal to the current system pressure difference B. In some embodiments, the opening degree of the electronic expansion valve 8 is increased to an opening degree D, and the opening degree D is 30% to 80%.

In some embodiments, because a large amount of refrigerant is stored in the flooded shell and tube exchanger 9, after the four-way valve 3 is reversed, the flooded shell and tube exchanger 9 changes from a low pressure side to a high pressure side, and if the electronic expansion valve 8 keeps the opening degree at startup unchanged, it is easy to cause liquid entrainment during suction of the compressor 1. At this point, the opening degree of the electronic expansion valve 8 is reduced, in some embodiments, the opening degree of the electronic expansion valve 8 is reduced to an opening degree E. The opening degree E is 30% to 80%, and the opening degree D and the opening degree E satisfy that D is greater than E.

In some other embodiments, when the opening degree of the electronic expansion valve 8 is reduced to the opening degree E, timing is started. After a first predetermined time period, the opening degree of the electronic expansion valve 8 is adjusted according to the following control method, to match the requirement of the unit for the refrigerant:

in a case that the actual superheat degree x and the target value C of suction superheat degree satisfy: $x-C \leq$ a first threshold XX, the opening degree of the electronic expansion valve 8 is reduced; or in a case that the actual superheat degree x and the target value C of suction superheat degree satisfy: the first threshold $XX < x-C <$ a second threshold XS, the opening degree of the electronic expansion valve 8 is kept unchanged; or in a case that the actual superheat degree x and the target value C of suction superheat degree satisfy: $x-C \geq$ the second threshold XS, the opening degree of the electronic expansion valve 8 is increased.

The target value C of suction superheat degree is the intrinsic parameter of the system. The actual superheat degree x can be obtained according to the formula: actual superheat degree x=suction temperature-saturation temperature corresponding to suction pressure, and the suction temperature is detected by the suction temperature sensor 15, and the saturation temperature corresponding to suction pressure is detected by the low pressure sensor 14.

In some other embodiments, in order to avoid faulty operations on the electronic expansion valve 8 caused by interference factors, and further ensure system stability, in a case that the actual superheat degree x and the target value C of suction superheat degree constantly satisfy in a second predetermined time period: $x-C \leq XX$, the opening degree of the electronic expansion valve 8 is reduced; or else, the opening degree of the electronic expansion valve 8 is kept unchanged; and in a case the actual superheat degree x and the target value C of suction superheat degree constantly satisfy in a third predetermined time period: $x-C \leq XS$, the opening degree of the electronic expansion valve 8 is increased; or else, the opening degree of the electronic expansion valve 8 is kept unchanged.

The first threshold XX, the second threshold XS, the first predetermined time period, the second predetermined time period and the third predetermined time period can be set according to a specific system. For example, the first threshold XX is 10 to 40, the second threshold XS is 5 to 10, the first predetermined time period is 30 s to 60 s, the second predetermined time period is 30 s to 60 s, and the third predetermined time period is 30 s to 60 s.

In some other embodiments, reducing the opening degree of the electronic expansion valve 8 comprises: the electronic expansion valve 8 is reduced at intervals of a fourth predetermined time period, a step of reducing each time being a first step EXV1, until the actual superheat degree x and the target value C of suction superheat degree satisfy: the first threshold $XX < x-C <$ the second threshold XS.

Increasing the opening degree of the electronic expansion valve 8 comprises: the electronic expansion valve 8 is increased at intervals of a fifth predetermined time period, a step of increasing each time being a second step EXV2, until the actual superheat degree x and the target value C of suction superheat degree satisfy: the first threshold $XX < x-C <$ the second threshold XS.

The fourth predetermined time period and the fifth predetermined time period can be set according to a specific system. For example, the fourth predetermined time period is 30 s to 60 s, and the fifth predetermined time period is 30 s to 60 s.

The first step EXV1 and the second step EXV2 can be fixed values and can be set according to a specific system. For example, the first step EXV1 is 0.1% to 1%, and the second step EXV2 is 0.1% to 1%. In some other embodiments, in order to further improve the accuracy of control, the first step EXV1 is determined according to a ratio between the actual superheat degree x and the target value C of suction superheat degree or a difference value between the actual superheat degree x and the target value C of suction superheat degree; the greater the difference between the actual superheat degree x and the target value C of suction superheat degree, the greater the first step EXV1; the smaller the difference between the actual superheat degree x and the target value C of suction superheat degree, the smaller the first step EXV1. Similarly, the second step EXV2 is determined according to the ratio between the actual superheat degree x and the target value C of suction superheat degree or the difference value between the actual superheat degree x and the target value C of suction superheat degree; the greater the difference between the actual superheat degree x and the target value C of suction superheat degree, the greater the second step EXV2; and the smaller the difference between the actual superheat degree x and the target value C of suction superheat degree, the smaller the second step EXV2.

In some other embodiments, an opening degree adjusting range of the electronic expansion valve 8 is set as 10% to 100%. The impact caused by performing faulty operation to the electronic expansion valve 8 due to system exception is reduced by setting a lower limit value of the opening degree of the electronic expansion valve 8, thereby further improving the system stability.

Furthermore, the disclosure also provides a heat pump system. The throttling element is controlled by any one of the above control methods, thereby ensuring the operating reliability of the heat pump system.

It will be readily understood by those skilled in the art that the above various preferred solutions can be freely combined and superimposed without conflict.

The above is only the embodiments of the disclosure and not intended to limit the disclosure; for those skilled in the art, the disclosure may have various modifications and changes. Any modifications, equivalent replacements, improvements and the like within the spirit and principle of the disclosure should fall within the protection scope of the claims of the disclosure.

What is claimed is:

1. A control method of a heat pump system, the heat pump system comprising a throttling element and a four-way valve, and the four-way valve having a first state in a case that the heat pump system operates for refrigerating and a second state in a case that the heat pump system operates for heating; wherein the control method comprises:
   before the four-way valve is switched from the first state to the second state, comparing a reversing pressure difference A of the four-way valve with a current system pressure difference B calculated by a system high pressure and a system low pressure of the heat pump system to obtain a comparison result; and
   controlling switching of a state of the four-way valve and adjusting an opening degree of the throttling element according to the comparison result, or controlling switching of a state of the four-way valve according to the comparison result, or adjusting an opening degree of the throttling element according to the comparison result,
   wherein the control method is applied to starting heating of the heat pump system in a low-temperature environment.

2. The control method as claimed in claim 1, further comprising:
   in a case that the reversing pressure difference A is less than the current system pressure difference B, prohibiting switching the state of the four-way valve, and increasing the opening degree of the throttling element; or
   in a case that the reversing pressure difference A is greater than or equal to the current system pressure difference B, switching the four-way valve from the first state to the second state.

3. The control method as claimed in claim 2, wherein in a case that the reversing pressure difference A is less than the current system pressure difference B, prohibiting switching the state of the four-way valve and increasing the opening degree of the throttling element comprises:
   the opening degree of the throttling element is increased to an opening degree D, the opening degree D being 30% to 80%.

4. The control method as claimed in claim 3, wherein after switching the four-way valve from the first state to the second state, the control method further comprises the opening degree of the throttling element is reduced.

5. The control method as claimed in claim 4, wherein the opening degree of the throttling element is reduced to an opening degree E, the opening degree E being 30% to 80%.

6. The control method as claimed in claim 5, wherein the opening degree D is greater than the opening degree E.

7. The control method as claimed in claim 4, wherein after reducing the opening degree of the throttling element and maintaining for a first predetermined time period, a current actual superheat degree x of the heat pump system is compared with a target value C of a suction superheat degree to control the opening degree of the throttling element.

8. The control method as claimed in claim 7, wherein in a case that the actual superheat degree x and the target value C of the suction superheat degree satisfy: $x-C \leq a$ first threshold XX, the opening degree of the throttling element is reduced; or
   in a case that the actual superheat degree x and the target value C of the suction superheat degree satisfy: the first threshold $XX < x-C < a$ second threshold XS, the opening degree of the throttling element is kept unchanged; or
   in a case that the actual superheat degree x and the target value C of the suction superheat degree satisfy: $x-C \geq$ the second threshold XS, the opening degree of the throttling element is increased.

9. The control method as claimed in claim 8, further comprising at least one of the following:
   the first predetermined time period is 30 s to 60 s;
   the first threshold XX is 1° C. to 4° C.; and
   the second threshold XS is 5° C. to 10° C.

10. The control method as claimed in claim 8, wherein in a case that the actual superheat degree x and the target value C of the suction superheat degree constantly satisfy: $x-C \leq$ the first threshold XX in a second predetermined time period, the opening degree of the throttling element is reduced, or else, the opening degree of the throttling element is kept unchanged; or in a case that the actual superheat degree x and the target value C of the suction superheat degree constantly satisfy: x−C≥the second threshold XS in a third predetermined time period, the opening degree of the throttling element is increased, or else, the opening degree of the throttling element is kept unchanged.

11. The control method as claimed in claim 10, further comprising at least one of the following:
the second predetermined time period is 30 s to 60 s; and
the third predetermined time period is 30 s to 60 s.

12. The control method as claimed in claim 8, wherein reducing the opening degree of the throttling element comprises: reducing the throttling element at intervals of a fourth predetermined time period, a step of reducing each time being a first step EXV1, and increasing the opening degree of the throttling element comprises: increasing the throttling element at intervals of a fifth predetermined time period, a step of increasing each time being a second step EXV2; or
reducing the opening degree of the throttling element comprises: reducing the throttling element at intervals of a fourth predetermined time period, a step of reducing each time being a first step EXV1; or
increasing the opening degree of the throttling element comprises: increasing the throttling element at intervals of a fifth predetermined time period, a step of increasing each time being a second step EXV2.

13. The control method as claimed in claim 12, further comprising at least one of the following:
the fourth predetermined time period is 30 s to 60 s;
the fifth predetermined time period is 30 s to 60 s;
the first step EXV1 is 0.1% to 1%; and
the second step EXV2 is 0.1% to 1%.

14. The control method as claimed claim 1, wherein the control method is applied to starting heating of the heat pump system in a low-temperature environment.

15. The control method as claimed in claim 14, wherein the temperature of the low-temperature environment is lower than −5° C.

16. The control method as claimed in claim 1, wherein the throttling element is an electronic expansion valve.

17. A heat pump system, comprising a throttling element and a four-way valve; wherein, the heat pump system is controlled by a control method, wherein the control method comprises:
before the four-way valve is switched from the first state to the second state, comparing a reversing pressure difference A of the four-way valve with a current system pressure difference B calculated by a system high pressure and a system low pressure of the heat pump system to obtain a comparison result; and
controlling switching of a state of the four-way valve and adjusting an opening degree of the throttling element according to the comparison result, or controlling switching of a state of the four-way valve according to the comparison result, or adjusting an opening degree of the throttling element according to the comparison result,
wherein the control method is applied to starting heating of the heat pump system in a low-temperature environment.

18. The control method as claimed in claim 2, wherein the control method is applied to starting heating of the heat pump system in a low-temperature environment.

19. The control method as claimed in claim 3, wherein the control method is applied to starting heating of the heat pump system in a low-temperature environment.

20. The control method as claimed in claim 4, wherein the control method is applied to starting heating of the heat pump system in a low-temperature environment.

* * * * *